(12) United States Patent
Kharchenko

(10) Patent No.: US 9,333,532 B2
(45) Date of Patent: May 10, 2016

(54) METHOD FOR PRODUCING A MATERIAL INCLUDING A SUBSTRATE PROVIDED WITH A COATING

(75) Inventor: Andriy Kharchenko, Palaiseau (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 226 days.

(21) Appl. No.: 13/810,678

(22) PCT Filed: Jul. 19, 2011

(86) PCT No.: PCT/FR2011/051733
§ 371 (c)(1),
(2), (4) Date: Jan. 17, 2013

(87) PCT Pub. No.: WO2012/022874
PCT Pub. Date: Feb. 23, 2012

(65) Prior Publication Data
US 2013/0115468 A1    May 9, 2013

(30) Foreign Application Priority Data
Jul. 27, 2010 (FR) ...................... 10 56165

(51) Int. Cl.
*B05D 3/06* (2006.01)
*B05D 3/02* (2006.01)
*B05D 5/12* (2006.01)
*C03C 17/36* (2006.01)
*B05D 5/00* (2006.01)

(52) U.S. Cl.
CPC . *B05D 5/12* (2013.01); *C03C 17/36* (2013.01); *C03C 17/366* (2013.01); *C03C 17/3618* (2013.01); *C03C 17/3626* (2013.01); *C03C 17/3644* (2013.01); *C03C 17/3652* (2013.01); *B05D 5/00* (2013.01); *C03C 2218/32* (2013.01); *C03C 2218/328* (2013.01); *C03C 2218/355* (2013.01)

(58) Field of Classification Search
USPC .............................. 427/154, 376.2
See application file for complete search history.

(56) References Cited

U.S. PATENT DOCUMENTS

| | | | |
|---|---|---|---|
| 3,625,718 A * | 12/1971 | Petticrew | 501/7 |
| 5,512,364 A * | 4/1996 | Chiba et al. | 428/332 |
| 6,503,630 B1 | 1/2003 | Teranishi et al. | |
| 6,849,328 B1 | 2/2005 | Medwick et al. | |
| 8,440,973 B1 * | 5/2013 | Fernandez et al. | 250/338.4 |
| 2002/0176988 A1 | 11/2002 | Medwick et al. | |
| 2004/0102057 A1 * | 5/2004 | Liu | H01L 21/324 438/795 |
| 2007/0029186 A1 * | 2/2007 | Krasnov et al. | 204/192.29 |
| 2007/0176104 A1 * | 8/2007 | Geneczko et al. | 250/338.1 |
| 2008/0318033 A1 * | 12/2008 | Zultzke et al. | 428/336 |
| 2009/0123654 A1 * | 5/2009 | Petrmichl et al. | 427/397.7 |
| 2009/0258073 A1 * | 10/2009 | Tishin et al. | 424/489 |
| 2010/0071810 A1 * | 3/2010 | Nadaud et al. | 148/400 |
| 2010/0230595 A1 * | 9/2010 | Uchida et al. | 250/338.4 |
| 2015/0062548 A1 * | 3/2015 | Evangelista et al. | 355/67 |

FOREIGN PATENT DOCUMENTS

| WO | 02 04549 | 1/2002 |
|---|---|---|
| WO | 2007/112229 | 10/2007 |
| WO | WO 2008096089 A2 * | 8/2008 |

OTHER PUBLICATIONS

Smietana et al "Evolution of Optical Properties with Deposition Time of Silicon Nitride and Diamond-like Carbon Films Deposited by Radio-frequency Plasma-enhanced Chemical Vapor Deposition Method" Thin Solid Films 519 (2011) 6339-6343.*
International Search Report Issued Nov. 29, 2011 in PCT/FR11/51733 Filed Jul. 19, 2011.
M. Lipiński, "Silicon Nitride for Photovoltaic Application", Archives of Materials Science and Engineering, International Scientific Journal, vol. 46, Issue 2, Dec. 2010, pp. 69-87.
"Refractive Index of Si3N4, Silicon Nitride, SiN, SiON", pp. 1-2, Filmetrics, Administered Jun. 22, 2015.
S. Zhou, et al. "Comparative investigation of infrared optical absorption properties of silicon oxide, oxynitride and nitride films", Seventh International Conference on Thin Film Physics and Applications, SPIE, vol. 7995, Feb. 17, 2011, pp. 1-2.
M. Smietana et al., "Evolution of optical properties with deposition time of silicon nitride and diamond-like carbon films deposited by radio-frequency plasma-enhanced chemical vapor deposition method", Thin Solid Films 519, Apr. 2011, pp. 6339-6343.
S. Reddy et al., "Preparation and properties of thin silicon nitride films", Indian Journal of Pure & Applied Physics, vol. 39, Jun. 2001, pp. 373-377.
R.E. Sah, et al., "Silicon Nitride Films Deposed Using ECR-PECVD Technique for Coating InGaAlAs High Power Laser Facets", Journal of the Electrochemical Society, 150 (7), May 2003, pp. F129-F133.

* cited by examiner

*Primary Examiner* — Nathan Empie
(74) *Attorney, Agent, or Firm* — Oblon, McClelland, Maier & Neustadt, L.L.P

(57) ABSTRACT

The subject of the invention is a process for obtaining a material comprising a substrate provided on at least one of its faces with a permanent coating comprising at least one thin film, said process comprising the following steps:

said permanent coating is deposited on at least one of the faces of said substrate; then a temporary coating is deposited directly on top of said permanent coating, said temporary coating comprising, as the layer closest to the substrate, at least one thin film soluble in a solvent, surmounted by at least one functional layer; then the substrate thus coated is subjected to a heat treatment; and then said coated substrate is treated with said solvent so as to remove said temporary coating from the surface of said substrate.

18 Claims, No Drawings

METHOD FOR PRODUCING A MATERIAL INCLUDING A SUBSTRATE PROVIDED WITH A COATING

CROSS REFERENCE TO RELATED APPLICATIONS

The present application is a 35 U.S.C. §371 national stage patent application of International patent application PCT/FR2011/051733, filed on Jul. 19, 2011, published as WO/2012/022874 on Feb. 23, 2012, the text of which is incorporated by reference, and claims the benefit of the filing date of French application no. 1056165, filed on Jul. 27, 2010, the text of which is also incorporated by reference.

The invention relates to the field of materials comprising a substrate, especially a glass substrate, provided on at least one of its faces with a permanent coating comprising at least one thin film.

Frequently, such materials must undergo heat treatment intended to improve the properties of the substrate and/or of the permanent coating. It may for example, in the case of glass substrates, be tempering heat treatments intended for increasing the mechanical strength of the substrate by creating high compressive stresses in the surface thereof. Such treatments may also improve certain properties of the permanent coating, especially by improving crystallization characteristics of the thin films within the coating. For example, a permanent coating comprising a silver layer, which possesses electrical conduction and low-E (low-emissivity) properties, sees these properties improved when its crystalline structure is of higher quality: grains of smaller size; reduction in grain boundaries; etc. The same applies to transparent electrically conductive oxides, frequently termed TCOs, for example indium tin oxide (ITO), or gallium-doped or aluminum-doped zinc oxides. As for titanium dioxide, its photocatalytic properties are improved by heat treatments for increasing its degree of crystallinity in the anatase form.

It is known to subject substrates provided with such coatings to tempering or annealing heat treatments in tempering or annealing furnaces, or else to rapid annealing treatments, for example using a flame, a plasma torch or laser radiation, as described in patent application WO 2008/096089.

Certain layers of the permanent coating may however be degraded during the heat treatment if they are not suitably protected. For example, a TCO layer subjected to a tempering heat treatment must be temporarily protected from oxidation, possibly using a silicon nitride protection layer. This protection layer must then be removed, generally by long and expensive etching treatment. The rapid annealing treatment of certain layers may be improved by the presence of layers that absorb infrared radiation, in particular in the case of treatment using a flame or laser radiation. It may be useful therefore to place on top of the permanent coating a temporary coating comprising such an absorbent layer. If the temporary coating is not removed during the annealing, it must be removed after the treatment, for example by etching processes.

The object of the invention is to obviate these drawbacks by providing a simpler and less expensive process.

For this purpose, one subject of the invention is a process for obtaining a material comprising a substrate provided on at least one of its faces with a permanent coating comprising at least one thin film, said process comprising the following steps:
said permanent coating is deposited on at least one of the faces of said substrate; then
a temporary coating is deposited directly on top of said permanent coating, said temporary coating comprising, as the layer closest to the substrate, at least one thin film soluble in a solvent, surmounted by at least one functional layer; then
the substrate thus coated is subjected to a heat treatment; and then
said coated substrate is treated with said solvent so as to remove said temporary coating from the surface of said substrate.

The presence, directly on top of the permanent coating, of a layer soluble in a solvent makes it possible, after the heat treatment, or during a subsequent step, to remove the entire temporary coating by simple washing using said solvent. The step of removing the temporary coating may advantageously be implemented after substrate transporting, cutting and handling steps, the temporary coating therefore being able to protect the surface of the substrate from scratches.

Another subject of the invention is a material comprising a substrate provided on at least one of its faces with a permanent coating, directly surmounted by a temporary coating comprising, as layer closest to the substrate, at least one thin film soluble in a solvent, surmounted by at least one functional layer.

Such a material is obtained as an intermediate product during implementation of the process according to the invention.

The preferred features that appear in the rest of the description are applicable both to the process according to the invention and, where appropriate, to the intermediate product according to the invention.

The substrate is preferably a glass or glass-ceramic sheet. It may also be a sheet of a polymeric material such as, for example, polycarbonate, polymethyl methacrylate or also polyethylene terephthalate (PET). The substrate is preferably transparent, colorless (it may then be a clear or extra-clear glass) or tinted, for example tinted blue, gray or bronze. The glass is preferably of the soda-lime-silica type, but it may also be a glass of the borosilicate or alumino-borosilicate type. Advantageously, the substrate has at least one dimension equal to or greater than 1 m, or even 2 m and even 3 m. The thickness of the substrate generally varies between 0.5 mm and 19 mm, preferably between 0.7 and 9 mm, especially between 2 and 8 mm, or even between 4 and 6 mm. The substrate may be flat or curved, or even flexible.

The glass substrate is preferably of the float glass type, that is to say capable of being obtained by a process consisting in casting the molten glass onto a bath of molten tin ("float" bath). In this case, the layer to be treated may be deposited just as well on the "tin" side as on the "atmosphere" side of the substrate. The terms "atmosphere side" and "tin side" are understood to mean those faces of the substrate that have been in contact with the atmosphere in the float bath and in contact with the molten tin, respectively. The tin side contains a small amount of tin on the surface that has diffused into the structure of the glass. The glass sheet may also be obtained by rolling between two rolls, which technique makes it possible in particular to imprint patterns on the surface of the glass.

In particular for applications in the photovoltaic field, when the permanent coating comprises a layer of a transparent electrically conductive oxide (TCO), it is preferable for the substrate to be made of extra-clear or ultra-clear glass, i.e. the light transmission or energy transmission of which is equal to or greater than 90%, especially 90.5%, more especially 91% and even 91.5%. The light transmission, usually abbreviated to $T_L$, is calculated according to the ISO 9050 (2003) standard and normalized to a glass thickness of 3.2 mm. The energy transmission, abbreviated to $T_E$, is also calculated according to the ISO 9050 (2003) standard and normalized to a glass thickness of 3.2 mm. Such glasses are generally obtained using raw materials depleted in iron, so that the iron oxide content in the final glass is at most 0.02%, especially 0.01%. In order for this transmission to be further optimized, it is preferable for the redox of the glass (i.e. the ratio of the ferrous iron weight content, expressed as FeO, to the total iron weight content, expressed as $Fe_2O_3$) to be equal to or less than 20%, preferably 10% and even zero. Such redox or transmission levels may be obtained in particular by oxidizing the iron using antimony oxide or cerium oxide, or by adding tungsten oxide, with a weight content of between 0.1 and 2%, and/or potassium oxide, with a weight content of between 1.5 and 10%, to the glass as taught in patent applications FR-A-2 921 356 and FR-A-2 921 357. It is also possible to bubble an oxidizing gas into the molten glass before the refining step, as taught in international patent application WO 2009/115725.

In photovoltaic applications, the dimensions of the glass substrate are typically the following: $0.6 \times 1.2$ m$^2$ or $1.1 \times 1.3$ m$^2$ or else $2.2 \times 2.6$ m$^2$ for a thickness between 1.6 and 6 mm, especially between 2.9 and 4 mm.

The permanent coating preferably comprises at least one thin film based on (or consisting of) a material chosen from transparent electrically conductive oxides (TCOs), silver and titanium dioxide.

Among TCOs, mention may be made of thin films based on mixed indium tin oxides (called ITOs), based on mixed indium zinc oxides (called IZOs), based on gallium-doped or aluminum-doped zinc oxide, based on niobium-doped titanium oxide, based on cadmium stannate or zinc stannate, or based on fluorine-doped and/or antimony-doped tin oxide. These various layers are employed in numerous systems in which the transparency and electrical conductivity properties are necessary: liquid crystal displays (LCDs), photovoltaic or solar collectors, electrochromic or electroluminescent devices, etc.

The doping levels, corresponding to the weight of dopant oxide divided by total weight, are in general less than 10%, or even 5%. In the case of aluminum-doped zinc oxide, the doping level (i.e. the weight of aluminum oxide divided by the total weight) is preferably less than 3%. In the case of gallium oxide, the doping level may be higher, typically between 5 and 6%. The thickness of the TCO layer is preferably between 2 and 1000 nm, especially between 50 and 800 nm, more especially between 150 and 600 nm.

The permanent coating may comprise, starting from a glass substrate, an underlayer acting as alkali-metal migration barrier, especially based on dielectric materials such as silicon or aluminum nitrides, oxides or oxynitrides, or any of their mixtures, and then the TCO layer. The underlayer especially prevents the deleterious effects of alkali metal ions migrating during the tempering or annealing heat treatment, or in an electric field during the operation of the photovoltaic cell.

Thin silver films are useful for many reasons: by reflecting infrared, thermal or solar radiation, they give the material low-E or solar-control functions; by conducting electricity, they also make it possible to obtain conductive materials, for example heated glazing or electrodes. To protect the silver from oxidation, dielectric layers flank the silver layer within the permanent coating. Preferably, the physical thickness of the or each silver layer is between 6 and 20 nm. The permanent coating preferably comprises, starting from the substrate, a first coating comprising at least a first dielectric layer, at least one silver layer, optionally an overblocker layer and a second coating comprising at least a second dielectric layer.

The overblocker layer is intended for protecting the silver layer during deposition of a subsequent layer (for example if this is deposited in an oxidizing or nitriding atmosphere) and during any heat treatment of the tempering or bending type. The silver layer may also be deposited on and in contact with an overblocker layer. The multilayer may therefore comprise an overblocker layer and/or an underblocker layer flanking the or each silver layer. The blocking layers (underblocker layer and/or overblocker layer) are generally based on a metal chosen from nickel, chromium, titanium, niobium, or an alloy of these various metals. Nickel-titanium alloys (especially those comprising about 50% by weight of each metal) or nickel-chromium alloys (especially those comprising 80% nickel by weight and 20% chromium by weight) may in particular be mentioned. The overblocker layer may also consist of several superposed layers, for example, on moving away from the substrate, a titanium layer and then a nickel alloy (especially a nickel-chromium alloy) layer, or the other way round. The various metals or alloys mentioned may also be partially oxidized, especially oxygen-substoichiometric (for example $TiO_x$ or $NiCrO_x$). The first and/or second dielectric layer is typically an oxide (especially tin oxide), or preferably a nitride, especially silicon nitride (in particular in the case of the second dielectric layer, that furthest away from the substrate).

Thin titanium dioxide films have the particular characteristic of being self-cleaning, facilitating the degradation of organic compounds through the action of ultraviolet radiation (photocatalysis) and the removal of mineral dirt (dust) through the action of running water. Titanium dioxide crystallized in the anatase form is much more effective in terms of organic compound degradation than amorphous titanium dioxide or titanium dioxide crystallized in the rutile or brookite form.

The titanium dioxide may optionally be doped with a metal ion, for example an ion of a transition metal, or with nitrogen atoms, carbon atoms, fluorine atoms, etc. The titanium dioxide may also be substoichiometric or superstoichiometric.

In the final material (after removal of the temporary coating), the entire surface of the titanium dioxide layer is preferably in contact with the outside so that the titanium oxide can fully fulfill its self-cleaning function. However, it may be advantageous to coat the titanium dioxide layer with a thin hydrophilic layer, especially based on silica. To further improve the crystallization of these layers, it is possible to provide, directly beneath the titanium dioxide layer, an underlayer having the effect of promoting the crystalline growth of titanium oxide, especially in anatase form. This may in particular be an underlayer made of $ZrO_2$ as described in patent application WO 02/40417, or an underlayer promoting heteroepitaxial growth of titanium oxide in anatase form, as described for example in patent application WO 2005/040058, especially a $BaTiO_3$ or $SrTiO_3$ layer. Other underlayers may be inserted between the substrate and the titanium dioxide layer. These may for example act as barrier layers preventing the migration of alkali metals, especially layers based on $SiO_2$, SiOC, alumina $Al_2O_3$ or silicon nitride $Si_3N_4$. They may also be layers or multilayers having thermal functions (solar-control or low-E layers or multilayers, especially of the type comprising at least one silver layer) or optical functions (for example antireflection layers or multilayers).

Whatever the nature of the permanent coating, that face of the substrate opposite the face provided with said permanent coating may be bare or may be covered with one or more thin films. This may especially be a film based on titanium dioxide or films having thermal functions (solar-control or low-E layers or multilayers, especially of the type comprising at least one silver layer) or optical functions (for example antireflection layers or multilayers). In photovoltaic applications, when the permanent coating comprises a TCO layer, the opposite face is advantageously provided with an antireflection coating. This coating may comprise one layer (for example based on porous silica having a low refractive index) or several layers: in the latter case, a multilayer based on alternating layers of dielectric material of low and high refractive indices and terminating in a layer having a low refractive index is preferred. This coating may especially be a multilayer as described in patent application WO 01/94989 or WO 2007/077373. The antireflection coating may also comprise, as final layer, a self-cleaning and antisoiling layer based on photocatalytic titanium oxide, as taught in patent application WO 2005/110937. A low reflection coefficient lasting over time may thus be obtained.

The permanent coating and the temporary coating may be obtained by any type of thin-film deposition process. The process may for example be one of the following types: sol-gel; pyrolysis (liquid or solid pyrolysis); chemical vapor deposition (CVD), especially plasma-enhanced chemical vapor deposition (PECVD), optionally atmospheric-pressure plasma-enhanced chemical vapor deposition (AP-PECVD); and evaporation. One or both of these coatings, especially both, are obtained by sputtering, especially magnetically enhanced sputtering (magnetron process). In this process, a plasma is created in a high vacuum close to a target comprising the chemical elements to be deposited. The active species of the plasma, by bombarding the target, tear off said elements, which are deposited on the substrate, forming the desired thin film. This process is a "reactive" process when the layer consists of a material resulting from a chemical reaction between the elements torn off from the target and the gas contained in the plasma. The major advantage of this process lies in the possibility of depositing a very complex multilayer on one and the same line by making the substrate run in succession between various targets, generally in one and the same device.

The solvent is preferably water-based. The bottom layer of the temporary coating is therefore soluble in water, and it can be removed simply by washing with water. Other solvents are possible, especially alcohols, but these are less preferred for environmental and cost reasons. The washing, especially with water, may be carried out in a known manner, for example by means of a washing machine. The removal step using a solvent, especially water, may be carried out after the glass has been cut, just before the conversion step, for example by integrating the material into a glazing unit. In this case, the soluble layer may protect the material from mechanical attack, for example from scratches, during the handling steps. The removal step may also be carried out immediately after the heat treatment.

The water-soluble thin film is advantageously based on (or consists of) a material chosen from metal halides and metal sulfates. The metal halides are especially chosen from NaCl and $SnF_2$. The metal sulfate may for example be $Al_2(SO_4)_3$. Such films may be resistant to the usual heat treatments.

Preferably, at least one functional layer (which surmounts the soluble layer within the temporary coating) is an oxidation protection layer or a radiation-absorbing layer, especially an infrared-absorbing layer.

The functional layer may especially be a nitride layer, for example a silicon nitride layer. This layer makes it possible to obtain a high oxidation resistance and may for example protect the TCO layers during tempering or annealing treatments. The thickness of these layers is typically between 5 and 200 nm, especially between 10 and 100 nm.

The layer absorbing infrared radiation is particularly useful when the heat treatment is carried out using a flame or infrared laser radiation. In the case of laser radiation in the visible or the UV, the functional layer will absorb this radiation. By absorbing the radiation and reemitting heat, this layer is in fact capable of increasing the amount of energy received by the layers to be treated and therefore makes it possible to increase the effectiveness of the treatment. The layer absorbing infrared radiation may be chosen from metals, such as titanium, carbon, especially in its amorphous or graphite forms, and metal nitrides, such as niobium nitride. The thickness of these layers is typically between 1 and 50 nm, especially between 2 and 20 nm.

The temporary coating may also comprise, between the soluble layer and the functional layer, a layer intended to protect the soluble layer from moisture. This layer may for example be a layer made of an oxide or nitride, for example made of silica or silicon nitride.

The heat treatment, intended for improving the crystallization of at least one thin film of the permanent coating, is preferably chosen from tempering, annealing and rapid annealing treatments. The improvement in crystallization may be quantified by an increase in the degree of crystallization (the proportion by weight or volume of crystallized material) and/or the size of the crystalline grains (or the size of the coherent diffraction domains measured by X-ray diffraction methods). This improvement in the crystallization may also be verified indirectly, by the improvement in the properties of the layer. In the case of a layer of TCO or silver type, the resistivity of the layer and its emissivity decrease, preferably by at least 5% in relative terms, or even at least 10% or 15%. In the case of titanium dioxide layers, the improvement in crystallization is manifested by an increase in the photocatalytic activity. In general, the activity is assessed by monitoring the degradation of model pollutants, such as stearic acid or methylene blue.

The tempering or annealing treatment is generally carried out in a furnace, namely a tempering or annealing furnace respectively. The entire material, including therefore the substrate, is heated to a high temperature, to at least 300° C. in the case of annealing and to at least 500° C., or even 600° C. in the case of tempering.

Rapid annealing is preferably carried out using a flame, a plasma torch or laser radiation. In this type of process, a relative movement between the substrate and the device (flame, laser, plasma torch) is created so as to treat the material. In general, the device is mobile, and the material runs past the device so as to treat its surface. These processes make it possible to deliver a high energy density to the layer to be treated in a very short time, thus limiting the diffusion of heat into the substrate, and therefore the heating of said substrate. The temperature of the substrate is generally at most 100° C. or 50° C. and even 30° C. during the treatment. Each point on the thin film is subjected to the rapid annealing treatment for a time generally not exceeding one second or even 0.5 seconds.

The rapid annealing heat treatment is preferably carried out using laser radiation, especially infrared radiation, the functional layer being a layer that absorbs the laser radiation, especially as described above. The wavelength of the radiation is preferably between 530 and 1200 nm, or between 600 and 1000 nm, especially between 700 and 950 nm and more especially between 800 and 950 nm. It is preferred to use laser diodes, for example emitting at a wavelength of around 808 nm, 880 nm, 915 nm or else 940 nm or 980 nm. In the form of systems of diodes, very high power levels may be obtained, possibly reaching surface power levels on the coating to be treated of greater than 20 kW/cm², or even 30 kW/cm².

Preferably, the laser radiation is emitted by at least one laser beam forming a line, called a "laser line" in the rest of the text, which simultaneously irradiates all or part of the width of the substrate. This embodiment is preferred as it avoids the use of expensive moving systems, which are generally bulky and difficult to maintain. The in-line laser beam may especially be obtained using systems of high-power laser diodes combined with focusing optics. The thickness of the line is preferably between 0.01 and 1 mm. The length of the line is typically between 5 mm and 1 m. The profile of the line may especially be a Gaussian curve or have a "top hat" configuration. The laser line simultaneously irradiating all or part of the width of the substrate may be made up of a single line (in which case it irradiates the entire width of the substrate) or a plurality of optionally separate lines. When a plurality of lines is used, it is preferable for each line to be placed so that the entire area of the multilayer is treated. The or each line is preferably placed so as to be perpendicular to the run direction of the substrate or placed obliquely. The various lines may treat the substrate simultaneously or in a delayed manner. The important point is that the entire surface is treated. The substrate may thus be moved, especially so as to run translationally past the stationary laser line, generally beneath it, but optionally above said laser line. This embodiment is particularly advantageous for a continuous treatment. Alternatively, the substrate may be stationary and the laser may be moved. Preferably, the difference between the respective speeds of the substrate and the laser is greater than or equal to 1 meter per minute, or 4 meters per minute or even 6, 8, 10 or 15 meters per minute, so as to ensure a high treatment rate. When it is the substrate that is moving, especially translationally, it may be moved using any mechanical conveying means, for example belts, rollers or trays running translationally. The conveying system is used to control and regulate the run speed. If the substrate is made of a flexible polymeric organic substance, it may be moved using a film advance system in the form of a succession of rollers. The laser may also be moved so as to adjust its distance from the substrate, which may in particular be useful when the substrate is bent, but not only in such a case. Indeed, it is preferable for the laser beam to be focused onto the coating to be treated so that the latter is located at a distance of less than or equal to 1 mm from the focal plane. If the system for moving the substrate or moving the laser is not sufficiently precise as regards the distance between the substrate and the focal plane, it is preferable to be able to adjust the distance between the laser and the substrate. This adjustment may be automatic, especially regulated using a distance measurement upstream of the treatment.

The laser radiation device may be integrated into a film deposition line, for example a magnetron sputtering line or a chemical vapor deposition (CVD) line, especially a plasma-enhanced (PECVD) line, under vacuum or at atmospheric pressure (AP-PECVD). In general, the line includes substrate handling devices, a deposition unit, optical control devices and stacking devices. For example, the substrates run on conveyor rollers, in succession past each device or each unit. The laser radiation device is preferably located just after the film deposition unit, for example at the exit of the deposition unit. The coated substrate may thus be treated in line after the film has been deposited, at the exit of the deposition unit and before the optical control devices, or after the optical control devices and before the substrate stacking devices. The laser radiation device may also be integrated into the deposition unit. For example, the laser may be introduced into one of the chambers of a sputtering deposition unit, especially in a chamber in which the atmosphere is rarefied, especially at a pressure between $10^{-6}$ mbar and $10^{-2}$ mbar. The laser may also be placed outside the deposition unit, but so as to treat a substrate located inside said unit. For this purpose, all that is required is to provide a window transparent to the wavelength of the radiation used, through which the laser beam passes to treat the film. It is thus possible to treat a film (for example a silver layer) before the subsequent deposition of another film in the same unit. When an absorbent layer is an overlayer, for example made of metal, its oxidation during the treatment may be impeded if the substrate is placed in a vacuum chamber. It is possible in this case to treat the multilayer in a special chamber, in which the oxidizing atmosphere is controlled. Whether the laser radiation device is outside the deposition unit or integrated thereinto, these "in-line" processes are preferable to a process involving off-line operations, in which it would be necessary to stack the glass substrates between the deposition step and the heat treatment.

However, processes involving off-line operations may have an advantage in cases in which the heat treatment according to the invention is carried out in a place different from that where the deposition is carried out, for example in a place where conversion of the glass takes place. The radiation device may therefore be integrated into lines other than the film deposition line. For example, it may be integrated into a multiple glazing (especially double or triple glazing) manufacturing line or into a laminated glazing manufacturing line. In these various cases, the heat treatment is preferably carried out before the multiple glazing or laminated glazing is produced.

The various features described above may be combined together, but these combinations are not explicitly described in order not to burden the text unnecessarily. However, a few combinations are explained in detail below.

In a first preferred embodiment, the substrate is a glass sheet and the permanent coating comprises a thin film of a transparent electrically conductive oxide (typically Al:ZnO or ITO, the geometric thickness generally ranging from 100 to 800 nm). The temporary coating deposited on and in contact with the permanent coating consists, starting from the layer closest to the substrate, of a water-soluble layer (typically a chloride, such as NaCl, the geometric thickness of which may typically range from 5 to 50 nm) followed by a protection layer, typically made of a nitride such as $Si_3N_4$. All of these layers are deposited by the magnetron process. The substrate thus coated then undergoes an annealing heat treatment intended to crystallize the thin film of a transparent electrically conductive oxide so as to reduce its resistivity. The temperature of such a treatment is typically between 400 and 700° C. After this heat treatment, the coated substrate is washed in water so as to remove the temporary coating.

In a second preferred embodiment, the substrate is a glass sheet and the permanent coating comprises at least a thin silver layer between at least two dielectric layers. The substrate is a glass sheet intended to form low-E glazing. The temporary coating deposited on and in contact with the permanent coating consists, from the layer closest to the substrate, of a water-soluble layer (typically made of a chloride such as NaCl, the geometric thickness of which may typically range from 5 to 50 nm) followed by a layer that absorbs the infrared radiation (typically a metallic titanium layer or a graphite layer). All of these layers are deposited by the magnetron process. The substrate thus coated then undergoes a rapid annealing heat treatment using a laser line past which the substrate runs (or alternatively, the laser may be moved above the stationary substrate). A typical wavelength of the laser may be 980 nm. The absorbent layer is oxidized in the case of titanium, and partially removed in the case of graphite. By washing with water it is possible to remove the entire temporary coating and therefore any trace of residual graphite or titanium oxide.

A third preferred embodiment differs from the second embodiment in that the permanent coating consists of a titanium dioxide layer optionally deposited on an underlayer acting as barrier to the migration of alkali metals, for example made of silica or silicon oxycarbide. The titanium dioxide layer may for example have a geometric thickness ranging from 3 to 30 nm, especially 5 to 20 nm.

The following examples illustrate the invention without however limiting it.

Various low-E multilayers were deposited on a clear glass substrate 4 mm in thickness sold under the name SGG Planilux by the Applicant. The multilayers were deposited in a known manner on a sputtering line (magnetron process) through which the substrate runs beneath various targets.

An NaCl water-soluble layer was deposited, also by the magnetron process, on a multilayer of the type substrate/ $Si_3N_4$/ZnO/Ag/NiCr/ZnO/$Si_3N_4$ (permanent coating) using a target consisting of NaCl and graphite. The latter is added so as to make the target electrically conductive.

A silica layer 150 nm in thickness was then deposited on this water-soluble layer, followed by a metallic titanium layer 10 nm in thickness that absorbs the infrared radiation. The deposition was also carried out by magnetron sputtering using a titanium target in an argon atmosphere. The temporary coating therefore consisted of the NaCl layer surmounted by an $SiO_2$ layer and the titanium layer.

The coated substrates were treated using an in-line laser emitting radiation with a wavelength of 980 nm, past which the coated substrate runs translationally at a speed of between 10 and 25 meters per minute.

After this rapid annealing treatment, the coated substrates were cleaned using a wet cloth. This washing operation enables the temporary coating to be completely removed.

The sheet resistance of the silver layer was reduced by at least 10% in relative terms following the heat treatment.

The invention claimed is:

1. A process for obtaining a material comprising a substrate comprising, on a face thereof, a permanent coating comprising a thin film, the process comprising:
   depositing the permanent coating on a face of the substrate, to obtain a first coated substrate; then
   depositing a temporary coating directly on top of the permanent coating, wherein the temporary coating comprises, as a layer closest to the substrate, a thin film soluble in a solvent, surmounted by a functional layer configured to absorb laser radiation having a wavelength of between 600 and 1200 nm, thereby obtaining a second coated substrate; then
   heat treating the second coated substrate by rapid annealing with laser radiation having a wavelength of between 600 and 1200 nm and a surface power level greater than 20 kW/cm$^2$ absorbed by the functional layer, thereby improving the crystallization of a thin film of the permanent coating; and then,
   contacting the second coated substrate with a solvent, thereby removing the temporary coating from the surface of the substrate, and wherein the process does not comprise heating the substrate to any temperature above 100° C.

2. The process of claim 1, wherein the substrate is a glass or glass-ceramic sheet.

3. The process of claim 2, wherein the substrate is a glass sheet.

4. The process of claim 2, wherein the substrate is a glass-ceramic sheet.

5. The process of claim 1, wherein the permanent coating comprises a thin film comprising a transparent electrically conductive oxide, silver, or titanium dioxide.

6. The process of claim 1, wherein the solvent is water-based.

7. The process of claim 6, wherein the thin film soluble in a solvent comprises a metal halide or a metal sulfate soluble in water.

8. The process of claim 7, wherein the water-soluble thin film comprises a metal halide.

9. The process of claim 7, wherein the water-soluble thin film comprises a metal sulfate.

10. The process of claim 1, wherein the permanent coating comprises a thin film comprising a transparent electrically conductive oxide.

11. The process of claim 1, wherein the permanent coating comprises a thin film comprising silver.

12. The process of claim 1, wherein the permanent coating comprises a thin film comprising titanium dioxide.

13. The process of claim 1, wherein the functional layer is a metal or metal nitride layer.

14. The process of claim 1, wherein the functional layer is a metallic titanium layer.

15. The process of claim 1, wherein the functional layer is a graphite layer.

16. The process of claim 1, wherein, between depositing the temporary coating and contacting the second coated substrate with a solvent, a duration of the heat treating is one second or less.

17. The process of claim 1, wherein the permanent coating is transparent.

18. The process of claim 1, wherein the functional layer is configured to absorb laser radiation having a wavelength of between 700 and 1200 nm, and wherein heat treating the second coated substrate by rapid annealing is with laser radiation having a wavelength of between 700 and 1200 nm and a surface power level of greater than 20 kW/cm$^2$ absorbed by the functional layer, thereby improving the crystallization of a thin film of the permanent coating.

* * * * *